(12) United States Patent
Horikiri et al.

(10) Patent No.: US 9,334,426 B2
(45) Date of Patent: May 10, 2016

(54) LATENT CURING AGENT AND EPOXY COMPOSITIONS CONTAINING THE SAME

(71) Applicant: Henkel AG & Co. KGaA, Duesseldorf (DE)

(72) Inventors: Masashi Horikiri, Kanagawa (JP); Atsushi Sudo, Tokyo (JP); Takeshi Endo, Yokohama (JP)

(73) Assignee: Henkel AG & Co. KGaA, Duesseldorf (DE)

( * ) Notice: Subject to any disclaimer, the term of this patent is extended or adjusted under 35 U.S.C. 154(b) by 62 days.

(21) Appl. No.: 14/266,910

(22) Filed: May 1, 2014

(65) Prior Publication Data

US 2014/0235738 A1 Aug. 21, 2014

Related U.S. Application Data

(60) Division of application No. 13/442,327, filed on Apr. 9, 2012, now abandoned, which is a continuation of application No. PCT/EP2009/063157, filed on Oct. 9, 2009.

(51) Int. Cl.

| | |
|---|---|
| C08G 59/44 | (2006.01) |
| C08K 5/05 | (2006.01) |
| C08K 5/07 | (2006.01) |
| C08K 5/13 | (2006.01) |
| C08K 5/20 | (2006.01) |
| C09J 11/06 | (2006.01) |
| C08G 59/50 | (2006.01) |
| C09J 163/00 | (2006.01) |

(52) U.S. Cl.
CPC ............ *C09J 11/06* (2013.01); *C08G 59/44* (2013.01); *C08G 59/50* (2013.01); *C08K 5/05* (2013.01); *C08K 5/07* (2013.01); *C08K 5/13* (2013.01); *C08K 5/20* (2013.01); *C09J 163/00* (2013.01)

(58) Field of Classification Search
None
See application file for complete search history.

(56) References Cited

U.S. PATENT DOCUMENTS

| | | | |
|---|---|---|---|
| 3,261,882 | A | 7/1966 | Gorton et al. |
| 3,488,742 | A | 1/1970 | Blekicki et al. |
| 3,639,657 | A | 2/1972 | Moran et al. |
| 5,212,261 | A | 5/1993 | Stierman |
| 5,304,679 | A | 4/1994 | McEvily et al. |
| 7,081,539 | B2 | 7/2006 | Ueno et al. |
| 2009/0274961 | A1 | 11/2009 | Koseki et al. |

FOREIGN PATENT DOCUMENTS

| | | |
|---|---|---|
| EP | 0440583 A2 | 7/1991 |
| EP | 0816393 A2 | 6/1997 |
| GB | 1067626 | 5/1967 |
| JP | 2001064275 A | 3/2001 |
| JP | 2006089492 A | 4/2006 |
| WO | 2004017936 A1 | 3/2004 |

OTHER PUBLICATIONS

HCAPLUS accession No. 1964:469041, Zagorevskii et al., "Pyran series; its analogs and related compounds. IX. Reaction of coumarin with amines," Zhurnal Obshchei Khimii, vol. 34, No. 7, 1964, one page.*
ASTM D1002, Oct. 5, 2005.

* cited by examiner

*Primary Examiner* — Robert Sellers
(74) *Attorney, Agent, or Firm* — Steven C. Bauman

(57) ABSTRACT

A latent curing agent obtained by the reaction of a coumarin compound of the general formula (1),

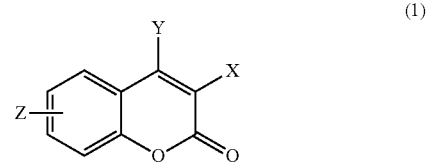
(1)

where X and Y can be independently H, an alkyl group, a heteroalkyl group, an aromatic group, a heteroaromatic group or an acetyl group and Z can be H, OH, an alkyl group, a heteroalkyl group, an aromatic group, a heteroaromatic group with an amine of the general formula (2),

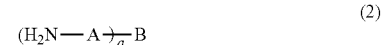
(2)

where "a" is 1 or 2,
A can be an alkylene group, a heteroalkylene group, an aromatic group, a heteroaromatic group,
and B can be an alkyl group (if a=1), an alkylene group (if a=2), a heteroalkyl group (if a=1), a heteroalkylene group (if a=2), an aromatic group, a heteroaromatic group, a hydroxyl group (if a=1), a secondary amino group (if a=2), O or S (if a=2), whereby B has the valency "a", or where B alone or where A and B together form a ring system selected from an aliphatic ring system, a heteroaliphatic ring system, or an aromatic ring system, can be used for curable compositions with a polyepoxide which has at least 2 1,2-epoxide groups per molecule.

11 Claims, No Drawings

LATENT CURING AGENT AND EPOXY COMPOSITIONS CONTAINING THE SAME

The application is a division of application Ser. No. 13/442,327, filed Apr. 9, 2012, now abandoned, which is a continuation of International Application No. PCT/EP2009/063157 filed Oct. 9, 2009.

The present invention is directed to a latent curing agent, and curable compositions containing said latent curing agent and at least one polyepoxide, a method for the preparation of said curing agent, and the use of the curable composition comprising said latent curing agent and a polyepoxide.

Numerous compositions and processes are described in the art for making and using a wide variety of epoxy-based compositions and additives in an effort to improve the curing properties, work-life and or adhesive strength and other key properties of adhesives useful in adhering, filling and making composite structures.

Epoxy-amine curing systems are one of the most widely applied formulations to adhesives, sealants, and coatings. The curing reaction, comprising an addition reaction between the amine and epoxide groups, usually occurs spontaneously at ambient temperature. To avoid the epoxy-amine reaction, epoxy resin and amine hardener have to be mixed immediately before the application of the curable composition. Yet curing reaction of such a system does not start before mixing, the mixing process immediately stimulates viscosity to increase, thus prohibiting easy mixing and application. In order to improve handling properties of these epoxy compositions it is desirable to give latent properties to the epoxy-amine curing systems, so that curing occurs only at elevated temperatures.

One component systems (frequently also referred to as "one package systems") are highly desirable because they allow manufacturers and consumers of epoxy compositions to avoid more complex packaging means, and to avoid the additional mixing step necessary before a separately packaged epoxy resin and curative can be converted into a cured material, and to avoid the probability that an incorrect amount of curing agent will be added to the resin by the ultimate consumer.

One of the oldest latent curatives is Dicyandiamide. It is often considered to be the "workhorse" of all one component (1K) epoxy curing agents due to its ease of use, excellent performance properties, long shelf stability and low toxicity. Dicyandiamide is supplied in a white crystalline powder form, which is only sparsely soluble in liquid epoxy resins. While Dicyandiamide performance properties in epoxy adhesives are in high demand, at times its activation temperature is too high for the desired efficiency in application and curing performance.

To improve the latent properties of amine hardeners, they are usually chosen from those which are solid at ambient temperatures to be able to coexist with epoxy compounds in a one package system for a reasonable period of time. The curing reactions of such compositions start at an elevated temperature which causes melting of the hardeners to allow the curing reaction with the epoxides. However, choices of such latent amine compounds are limited.

U.S. Pat. No. 3,488,742 and U.S. Pat. No. 3,639,657 disclose the reaction products of approximately equimolecular proportions of an acid anhydride, such as phthalic anhydride, and a polyamine, such as diethyl-enetriamine. They are reported to be effective latent accelerators for dicyandiamide in the curing of epoxy resin systems. The combination of dicyandiamide with the said reaction product of the acid anhydride and polyamine are said to provide systems which, when combined with epoxy resins, will be stable for long periods when stored at ambient temperatures while still providing hardened products of satisfactory or good properties on curing for relatively short periods at elevated temperatures, in the order of 100° C. to 150° C.

According to EP 440583 reaction products of polyallylnadic anhydride and various polyamines, such as ethylene diamine, diethylene triamine, triethylene tetramine, 1,3-diaminopropane, 1,6-diaminohexane, imino-bis(propyl amine) and methyl-imino-bis(propylamine), are latent hardeners for use in epoxy resins having more than one 1,2-epoxy groups per molecule. Mixtures of these products and epoxy resins are said to be stable at room temperature for extended periods, yet cure quickly at elevated temperatures to yield products with high glass transition temperatures.

From U.S. Pat. No. 3,261,882 adhesives are known, which are made from polyisophthalamides and thermosetting epoxy resin syrups. According to this reference, the polyisophthalamides can be made among others from $C_2$- to $Ci_6$-diamines, such as ethylenediamine, propylenediamine or hexamethylenediamine, and isophthalic acid.

Reaction products of a carboxylic acid-containing microgel, especially a crosslinked copolymer, and a nitrogen containing base are disclosed in EP816393. Said microgels can be prepared by reaction of a carboxylic acid with an N-containing base at 0° C.-200° C., wherein the number of carboxylic acid groups is at least equal to the number of basic N atoms. Also disclosed are epoxy resin compositions containing the reaction product as a hardener. According to this reference, it is preferred that the reaction product is a copolymer of an unsaturated carboxylic acid with a multifunctional crosslinker and optionally also a COOH group-free vinyl monomer. As suitable unsaturated acids are mentioned (meth)acrylic acid, 2-carboxyethyl(meth)acrylate, phthalic acid (2-(meth)acryloyl) ester, maleic- or fumaric-acid, (or their mono-methyl- or -ethyl-esters), itaconic acid, cinnamic acid, crotonic acid, 4-vinylcyclohexane carboxylic acid, 4-vinylphenylacetic acid or 4-vinylbenzoic acid. The crosslinker is especially ethylene- or propylene-glycol di(meth)acrylate, 1,4-butanediol di(meth)acrylate, polyethylene- or polypropylene-glycol di(meth)acrylate, 1,1,1-trimethylolpropane tri(meth)acrylate, bisphenol-A diglycidylether di(meth)acrylate, (meth)acrylic acid allyl ester, divinylcyclohexane or divinylbenzene. The non-carboxylic vinyl monomer is Me-, Et- or Bu-(meth)acrylate, 2-hydroxyethyl(meth)acrylate, 2-ethylhexyl(meth)acrylate or styrene. As suitable nitrogen base are disclosed an amine, poly-amine or imidazole.

Thus in the art a variety of amine hardeners are modified with other compounds to reduce activity of amino groups and/or to convert them into a solid state at ambient temperature.

There is still a need for amine hardeners with effective deactivation of primary amino groups towards epoxides to result in improvement of latency of the curable composition. In addition an improvement of adhesion to metal surfaces is desirable, as well as a reduction of the heat required for curing the composition. Moreover an acceleration of the curing reaction of an epoxy-imidazole curing system under an elevated temperature would be advantageous.

One object of the present invention is to provide a latent curing agent obtained by the reaction of a coumarin compound of the general formula (1)

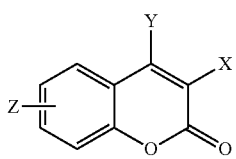
(1)

with an amine of the general formula (2)

(2)

In formula (1) X and Y can be independently H, an alkyl group, a heteroalkyl group, an aromatic group, a heteroaromatic group or an acetyl group, and Z can be H, OH, an alkyl group, a heteroalkyl group, an aromatic group, a heteroaromatic group.

In formula (2), "a" is an integer of 1 or 2, A can be an alkylene group, a heteroalkylene group, an aromatic group, a heteroaromatic group, and B can be an alkyl group (if a=1), an alkylene group (if a=2), a heteroalkyl group (if a=1), a heteroalkylene group (if a=2), an aromatic group, a heteroaromatic group, a hydroxyl group (if a=1), a secondary amino group (if a=2), O or S (if a=2), whereby B has the valency "a" (meaning that B forms a number of "a" bonds to A), or where B alone or where A and B together form a ring system selected from an aliphatic ring system, a heteroaliphatic ring system, or an aromatic ring system. A and B can independently be completely saturated (i.e. do not contain double or triple bonds), partially unsaturated (i.e. contain one or more double or triple bonds), or contain or form aromatic ring systems.

For example, A in formula 2 can be a —($CH_2$—)$_x$ group with, for example, x=1, 2, 3, 4, 5, 6, 7, 8, 9, 10, 11, 12 ore more. In this case, if "a"=1, B may be a methyl group (so that the amine is a monoalkylamine), a hydroxyl group (so that the amine is a monoalkanolamine), or "a"=2 and B is a methylene group, so that either a linear alkylene diamine is formed, or A and B together form a ring system. If "a"=2 and B is —O— or —S—, the amine is a di(aminoalkyl)ether or -thioether. Alternatively, A and B may be selected in a way that they form together a poly(oxyalkylene) chain, so that the amine is a poly(oxyalkylene)diamine, e.g. of the type known as a "Jeffamine™". Furthermore, A and B may be selected in a way that the amines explicitly named below are formed.

A further embodiment of the present invention is a curable composition containing at least one latent curing agent as identified above and a polyepoxide which has at least 2 1,2-epoxide groups per molecule.

Still an other object of the present invention is a method of making a curing agent from a coumarin compound of formula (1) and an amine of formula (2) comprising the steps of (a) mixing at least one of the mono- or diamines with the coumarin, optionally in the presence of an polar solvent, (b) heating the reaction mixture to a temperature between room temperature (20° C.) and 70° C. until the monoamine or diamine has completely reacted with the coumarin, (c) precipitating the reaction mixture into a nonsolvent for the coumarin amine reaction product, (d) filtering the precipitate from the liquid phase, and (e) drying the coumarin amine reaction product.

Examples of suitable coumarin compounds of formula (1) are 7,8-dihydroxy-1-benzopyran-2-one (also known as daphnetin), 6,7-dihydroxy-1-benzopyran-2-one (also known as esculetin), 7-hydroxy-1-benzopyran-2-one (also known as umbelliferone), 4-methyl-7,8-dihydroxy-1-benzopyran-2-one (also known as 4-methyldaphnetin) and especially the basic 1-benzopyran-2-one (coumarin).

The amine of formula (2) can preferably be selected from monoamines as exemplified by a group consisting of butylamine, pentylamine, hexylamine, heptylamine, octylamine, nonylamine, decylamine, dodecylamine, cyclohexylamine, aminomethylcyclohexane, N-aminoethyl-piperidine, 1-amino-3,5,5-trimethyl-cyclohexane, benzylamine, aminophenol, 2-aminoethanol, 3-amino-1-propanol, 4-amino-1-butanol, 5-amino-1-pentanol, or polyamines, particularly diamines as exemplified by the group consisting of tetramethylenediamine, hexamethylenediamine (HMDA), 2-methylpentamethylenediamine, nonamethylenediamine, undecamethylenediamine, dodecamethylenediamine, 2,2,4-trimethylhexamethylenediamine, 2,4,4-trimethylhexamethylenediamine, 5-methyl-nonamethylenediamine, 1,3-bis(aminomethyl)cyclohexane, 1,4-bis(aminomethyl)cyclohexane, 1-amino-3-aminomethyl-3,5,5-trimethylcyclohexane, bis(4-aminocyclohexyl)methane, bis(3-methyl-4-aminocyclohexyl)methane, 2,2-bis(4-aminocyclohexyl)-propane, polyoxytetramethylenediamine, triethyleneglycoldiamine, poly-oxyethylenediamines, polyoxyethylenetriamines, polyoxypropylenediamines (also known under the trade name "Jeffamine™" from Huntsman), m-xylylenediamine (m-XDA), p-xylylenediamine (p-XDA), 1,4-bis(aminopropyl)piperidine (BAPP), 1-propanamine, 3,3'-(oxy bis(2,1-ethanediyloxy))bis-1-propan-amine, (di-aminopropylated diethylene glycol, also known under the trade name "ANCAMINE™ 1922A" from Air Products), 1,3-diaminocyclohexane, 1,4-diaminocyclohexane, di(aminomethyl)cyclohexane, 1-amino-3-aminomethyl-3,5,5-trimethylcyclohexane (commonly called "isophoronediamine"), cyclohexylenediamine, 4,4'-isopropylidenedicyclohexyldiamine, and 3,3'-dimethyl-4,4'-isopropylidenedicyclohexyldiamine, or mixtures of the mono- and/or diamines listed above.

The reaction products of coumarin with monoamines can be quantitatively obtained from the precursor monoamine compounds in one step, by the reaction of the monoamine with the selected coumarin. It may be appropriate to use a polar solvent such as methanol, ethanol, acetone, dimethyl sulfoxide (DMSO), N,N-dimethylacetamide (DMA) or tetrahydrofurane (THF). If necessary, mixtures of polar solvents can be used. The reaction product is normally obtained in quantitative yield and has the following general formula (3).

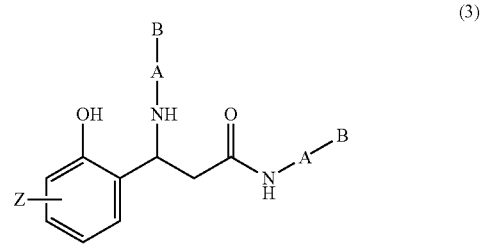
(3)

In formula (3), A, B and Z have the same meaning as defined above for "a"=1.

Typically, the primary monoamine is reacted at a stoichiometric ratio of 2 equivalents of amine to 1 equivalent of the coumarin.

If desired, the reaction rate between coumarin and the amine can be accelerated by adding basic catalysts to the reaction mixture. Suitable basic catalysts are tertiary amines, such as trimethylamine, triethylamine, tributylamine, N,N-dimethylaniline, N,N-dimethyl-benzylamine, pyridine, N-methylpiperidine, N-methylmorpholine, N,N-dimethylaminopyridine, derivatives of morpholine such as bis(2-(2, 6-dimethyl-4-morpholino)ethyl)-(2-(4-morpholino)ethyl) amine, bis(2-(2,6-dimethyl-4-morpholino)ethyl)-(2-(2,6-diethyl-4-morpholino)ethyl)amine, tris(2-(4-morpholino)ethyl)amine, tris(2-(4-morpholino)propyl)amine, guanidines, such as 1,1,3,3-tetramethyl guanidine, diazabicyclooctane (DABCO), and especially heterocyclic compounds having an amidine bonding such as diazabicyclononene (DBN) or diazabicycloundecene (DBU).

If the selected amine is a primary diamine, it is reacted at a stoichiometric ratio of 1 equivalent of amine to 1 equivalent of the coumarin basically under similar reaction conditions as the reaction of the monoamine, including the optional use of solvents and/or catalysts. The separation of the reaction products from the synthesis mixture can be done by precipitation into non-polar solvents which are non solvents for the adduct. Non solvents or poor solvents for the adduct are for example diethylether, dichloromethane, alcohols, acetone or mixtures thereof.

In this case, the formed adducts are oligomeric compositions which have the recurrent structure of formula (4):

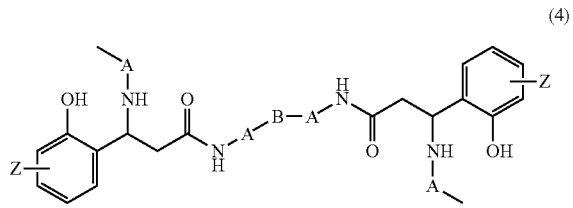

(4)

In formula (4), A, B and Z have the same meaning as defined above for formulas (1) and (2), respectively, for "a"=2.

Typically, the molecular weight ($M_n$) of the oligomers of formula (4) is in the range between 2000 and 20 000, preferably between 4000 and 10 000.

Curable compositions can be formulated by mixing the latent curing agent according to formula (3) and/or (4) with at least one polyepoxide which has at least 2 1,2-epoxide groups per molecule at room temperature (approximately 20° C.) or slightly elevated temperatures (e.g. up to about 50° C.).

At least one polyepoxide used may include multifunctional epoxy-containing components, such as $C_i$-$C_{28}$ alkyl-, polyphenol glycidyl ethers; polyglycidyl ethers of pyrocatechol, resorcinol, hydroquinone, 4,4'-dihydroxydiphenyl methane (or bisphenol F, such as RE-303-S or RE-404-S available commercially from Nippon Kayaku, Japan), 4,4'-dihydroxy-3,3'-dimethyldiphenyl methane, 4,4'-dihydroxydiphenyl dimethyl methane (or bisphenol A), 4,4'-dihydroxydiphenyl methyl methane, 4,4'-dihydroxydiphenyl cyclohexane, 4,4'-dihydroxy-3,3'-dimethyldiphenyl propane, 4,4'-dihydroxydiphenyl sulfone, and tris(4-hydroxyphenyl) methane; polyglycidyl ethers of transition metal complexes; chlorination and bromination products of the above-mentioned diphenols; polyglycidyl ethers of novolacs; polyglycidyl ethers of diphenols obtained by esterifying ethers of diphenols obtained by esterifying salts of an aromatic hydrocarboxylic acid with a dihaloalkane or dihalogen dialkyl ether; polyglycidyl ethers of polyphenols obtained by condensing phenols and long-chain halogen paraffins containing at least two halogen atoms; phenol novolac epoxy; cresol novolac epoxy; and combinations thereof.

Among the commercially available epoxy components suitable for use in the present invention are polyglycidyl derivatives of phenolic compounds, such as those available under the tradenames EPON 825, EPON 826, EPON 828, EPON 1001, EPON 1007 and EPON 1009, cycloaliphatic epoxy-containing compounds such as Araldite CY179 from Huntsman or water-borne dispersions under the tradenames EPI-REZ 3510, EPI-REZ 3515, EPI-REZ 3520, EP1-REZ 3522, EPI-REZ 3540 or EPI-REZ 3546 from Hexion; DER 331, DER 332, DER 383, DER 354, and DER 542 from Dow Chemical Co.; GY285 from Huntsman, Inc.; and BREN-S from Nippon Kayaku, Japan. Other suitable epoxy-components include polyepoxides prepared from polyols and the like and polyglycidyl derivatives of phenol-formaldehyde novolacs, the latter of which are available commercially under the tradenames DEN 431, DEN 438, and DEN 439 from Dow Chemical Company and a waterborne dispersion ARALDITE PZ 323 from Huntsman.

Cresol analogs are also available commercially such as ECN 1273, ECN 1280, ECN 1285, and ECN 1299 or water-borne dispersions ARALDITE ECN 1400 from Huntsman, Inc. SU-8 and EPI-REZ 5003 are bisphenol A-type epoxy novolacs available from Hexion. Epoxy or phenoxy functional modifiers to improve adhesion, flexibility and toughness, such as the HELOXY brand epoxy modifiers 67, 71, 84, and 505. When used, the epoxy or phenoxy functional modifiers may be used in an amount of about 1:1 to about 5:1 with regard to the heat curable resin.

Of course, combinations of the different epoxy resins (epoxy components) are also desirable for use herein.

The curing of the epoxy resin(s) utilized in the present invention may be additionally assisted by the incorporation of other substances capable of promoting the desired hardening upon heating. Such materials are referred to herein as "curatives", but also include the materials referred to by workers in the field as curing agents, hardeners, accelerators, activators, and catalysts. While certain curatives promote epoxy resin curing by catalytic action, others participate directly in the reaction of the resin and become incorporated into the thermoset polymeric network which is formed. Although any of the curatives (curing agents) known in the epoxy resin field (see the corresponding chapter in the Encyclopedia of Polymer Science and Engineering) may be used in the present invention in addition to the amine-epoxy adduct, the use of one or more nitrogen-containing compounds such as imidazoles—including for example 2-methyl imidazole, 2,4-dimethyl imidazole, 2-ethyl-4-methyl imidazole, 2-phenyl imidazole, 1-benzyl-2-methylimidazole (BMI) and the like—, heterocyclic compounds having an amidine bonding such as diazabicyclo-nonene (DBN) or diazabicycloundecene (DBU), substituted ureas such as p-chlorophenyl-N,N-dimethylurea (MONURON), 3-phenyl-1,1-dimethylurea (FENURON) or 3,4-dichlorophenyl-N,N-dimethylurea (DIURON), amino compounds like tertiary aryl- or alkylamines, such as, for example, benzyldimethylamine, tris(dimethylamino)phenol, piperidine or piperidine derivatives, amine salts, and quaternary ammonium compounds as the auxiliary curative(s) is desirable (provided that such compounds which cause an unacceptably high degree of epoxy resin reaction under normal storage conditions are avoided). Dicyandiamide (sold commercially by Air Products under the trademark "AMICURE CG") is a particularly preferred auxiliary curative, although other guanidine compounds may also be utilized. In one desirable embodiment of the invention, dicyandiamide (preferably, about 0.5-8 wt. % based on the total weight of the thermosettable composition) is used in combination with an amine-epoxy adduct (preferably, about 0.1-5 wt %) in the curative system. The curative system must, however, be selected such that it does not catalyze curing of the thermosettable composition to any significant extent under typical storage conditions over an extended period. Preferably, the amounts and identities of the components of the curative system are selected such that the thermosettable composition remains stable for at least two weeks in storage at about 50° C. without a significant loss in cured properties, but cures within about 10 minutes upon being heated at about 135° C. Particularly preferred curatives are heterocyclic amidines such as DBU, DBN, imidazole and its derivatives.

Other additives which the inventive curable compositions can include are tougheners, plasticizers, extenders, reactive diluents, microspheres, fillers, and reinforcing agents, for example coal tar, bitumen, textile fibres, glass fibres, asbestos fibres, boron fibres, carbon fibres, mineral silicates, mica, powdered quartz, hydrated aluminum oxide, bentonite, wollastonite, kaolin, silica, aerogel or metal powders, for example aluminium powder or iron powder, and also pigments and dyes, such as carbon black, oxide colors and titanium dioxide, fire-retarding agents, thixotropic agents, flow control agents, such as silicones, waxes and stearates, which can, in part, also be used as mold release agents, adhesion promoters, antioxidants and light stabilizers, the particle size and distribution of many of which may be controlled to vary the physical properties and performance of the inventive polymerizable composition.

When used, fillers are used in an amount sufficient to provide the desired rheological properties. Fillers may be used in an amount up to about 50 percent by weight, such as about 5 to about 32 percent by weight, for instance about 10 to about 25 percent by weight, relative to the total weight of the composition. The fillers may be inorganic ones, such as silicas. For instance, the silica filler may be a silica nanoparticle.

Reactive diluents are another constituent of the binder composition according to the one embodiment of the invention. Reactive diluents in the context of this invention are low-viscosity substances which contain epoxide groups (glycidyl ethers or glycidyl esters) and have an aliphatic or aromatic structure. These reactive diluents on the one hand serve to lower the viscosity of the binder system above the softening point, and on the other hand they control the pre-gelling process in injection moulding. Typical examples of reactive diluents which can be employed according to the invention are mono-, di- or triglycidyl ethers of C6- to C14-monoalcohols or alkylphenols and the monoglycidyl ethers of cashew nut shell oil, diglycidyl ethers of ethylene glycol, diethylene glycol, triethylene glycol, tetraethylene glycol, 1,2-propylene glycol, 1,4-butylene glycol, 1,5-pentanediol, 1,6-hexanediol or cyclohexanedimethanol, triglycidyl ethers of trimethylolpropane and the glycidyl esters of C6- to C24-carboxylic acids or mixtures thereof.

Optionally, at least one diluent is a heat transfer fluid; more preferably a heat transfer fluid derived from an aromatic oil, a glycol oil, a petroleum oil, a fluorocarbon oil, and/or a silicone oil; and most preferably a heat transfer fluid with oxidative stability. Preferred heat transfer fluids include MARLOTHERM LH, MARLOTHERM N, MARLOTHERM P1, MARLOTHERM P2, MAR-LOTHERM SH, and MARLOTHERM X from Sasol North America Inc.

In order to obtain expandable structural foams the composition will additionally comprise a "blowing agent". All known blowing agents, such as e.g. the "chemical blowing agents" which liberate gases by decomposition or "physical blowing agents", i.e. expanding hollow beads, are in principle suitable as the blowing agent. Examples of physical blowing agents are expandable microspheres which are available from Akzo Nobel AB under the trademark EXPANCEL or from Henkel under the trademark DUALITE. Examples of chemical blowing agents are azobisisobutyronitrile, azodicarboxamide, di-nitroso-pentamethylenetetramine, 4,4'-oxybis(benzenesulfonic acid hydrazide), diphenyl-sulfone-3,3'-disulfohydrazide, benzene-1,3-disulfohydrazide and p-toluenesulfonyl semicarbazide.

Preferred curable compositions of the present invention will comprise (a) at least one reactive epoxy resin 10-60 wt. %, preferably 30-40 wt. %, (b) at least one latent curing agent according to this invention 2-50 wt %, preferably 10-40 wt. %, (c) optionally a flexibilizing agent 0-25 wt. %, preferably 1-15 wt. %, (d) optionally a reactive diluent 0-15 wt. %, preferably 1-10 wt %, (e) optionally least one finely divided filler 0-50 wt. %, preferably 5-30 wt %, (f) optionally an accelerator 0-5 wt. %, (g) optionally a blowing agent 0-3 wt. %, the sum of the total constituents being 100 wt. %.

To prepare the curable compositions of the present invention, the epoxy resin or resins, the latent curing agent and the optional components such as the flexibilizing agent, the reactive diluent together with the fillers, fibers and pigments are homogenized in a conventional mixing unit, such as a planetary mixer, kneader, speed mixer or the like. At the last stage the optional accelerator and/or blowing agents will be blended in. Care should be taken, that the temperature of the mass does not exceed about 40° C. to 60° C. during mixing.

As noted, the curable compositions according to this invention are in particular suitable as coatings, adhesives—particularly structural adhesives-, sealants, encapsulants, reinforcing structural foams and matrices for the preparation of reinforced materials such as prepregs and tow-pregs, and/or can be used in injection molding or extrusion or in the formation of prepregs or towpregs formed from a layer or bundle of fibers infused with the polymerizable composition. The curable compositions are basically thermo-setting, 1K or 2K components epoxy-amine compositions.

The invention is illustrated in more detail in the following embodiment examples, where the choice of examples is not intended to represent a limitation of the scope of the subject matter of the invention, and is merely intended to represent individual embodiments and advantageous effects of the invention by way of a model.

Unless stated otherwise, all the amounts of constituents of the compositions given in the following examples are parts by weight or percentage by weight.

EXAMPLES

Example 1

Synthesis of a Monoamine Adduct of Coumarin

Coumarin (0.3775 g, 2.583 mmol), 2.0 equimolar of n-hexylamine (0.5324 g, 5.261 mmol) and 0.1 equimolar of DBU (0.0418 g, 0.275 mmol) were added and mixed in bulk. The mixture was reacted in an oven and kept at 50° C. for 10 days. The resultant crude mixture was separated by preparative Thin Layer Chromatography (TLC) (eluent: ethylacetate/ n-hexane=1/4 (vol./vol.)) to give corresponding coumarin monoamine (1:2) adduct (0.8287 g, 2.378 mmol, yield=92%).

Examples 2-5

Synthesis of a Diamine Adduct of Coumarin

To a DMSO solution of coumarin (5.537 g, 37.89 mmol, concentration=3 M) in a flask, 1.0 equimolar of m-xylylene-diamine (m-XDA) (5.168 g, 37.95 mmol) and 0.1 equimolar of DBU (0.579 g, 3.803 mmol) were added. The resultant mixture was reacted at 50° C. for 10 days with stirring. After separation by precipitation into diethylether, the corresponding coumarin-m-XDA (1:1) adduct was obtained as a precipitation (10.213 g, yield=95%).

Other coumarin-diamine (1:1) adducts were similarly obtained (see Table 1).

TABLE 1

| Example | Diamine | Reaction Condition | $Mn^{1,2)}$ | $Mw/Mn^{1,2)}$ | $Yield^{3)}$ |
|---|---|---|---|---|---|
| 2 | m-XDA | 50° C., 10 days | 8400 | 2.6 | 95 |
| 3 | HMDA | 50° C., 10 days | 7600 | 2.9 | 100 |
| 4 | Ancamine 1922A | 50° C., 10 days | 6400 | 3.2 | 100 |
| 5 | BAPP | 60° C., 10 days | 4100 | 3.0 | 75 |

Remarks
[1]determined by Gel Permeation Chromatography (GPC)
[2]dimethylformamide (DMF) soluble part
[3]isolated yield Examples 6-10

Curable Compositions Containing Amine Adducts of Coumarin

Bisphenol A diglycidyl ether (Bis A-DGE), coumarin amine adduct and, optionally, 1-benzyl-2-methylimidazole (BMI) were mixed with a speed mixer (AR-100, THINKY Corp., Japan) at room temperature in air and degassed under vacuum to obtain curable compositions according to the invention listed in table 2.

TABLE 2

| Example | epoxide (amount) | Curing agent from example (amount) | accelerator |
|---|---|---|---|
| 6 | Bis A-DGE (0.900 g) | 2 (0.498 g) | — |
| 7 | Bis A-DGE (2.964 g) | 3 (1.523 g) | — |
| 8 | Bis A-DGE (1.456 g) | 4 (1.045 g) | — |
| 9 | Bis A-DGE (2.070 g) | 5 (1.400 g) | — |
| 10 | Bis A-DGE (2.569 g) | 1 (0.526 g) | BMI (0.039 g) |

Reference Examples 11-15

Curable Compositions Containing Free Amines

For comparison, curable compositions from Bisphenol A diglycidyl ether (Bis A-DGE) and free amines were mixed with a speed mixer (AR-100, THINKY Corp., Japan) at room temperature in air and degassed under vacuum to obtain reference compositions listed in table 3.

TABLE 3

| Example | Epoxide (amount) | Curing agent (amount) | accelerator |
|---|---|---|---|
| 11 | Bis A-DGE (1.096 g) | m-XDA (0.219 g) | — |
| 12 | Bis A-DGE (0.952 g) | HMDA (0.162 g) | — |
| 13 | Bis A-DGE (3.200 g) | Ancamine 1922A (1.036 g) | — |
| 14 | Bis A-DGE (2.332 g) | BAPP (0.686 g) | — |
| 15 | Bis A-DGE (1.934 g) | Hexylamine (0.115 g.) | BMI (0.029 g) |

Curing Reactions

The curable compositions of examples 6 to 15 were analysed by Differential Scanning Calorimetry (DSC) in a dynamic heating mode (10° C./min). 10 mg of each of the formulations was heated for the DSC. The resulting heat evolution profiles are shown in table 4. In all cases, utilising the adducts of the invention as hardeners resulted in increases in onset and peak top temperatures (Table 4), suggesting that the inventive compositions 6-10 are much more stable than the reference compositions 11-15. At the same time, the cure heat ($\Delta H$) of the compositions cured with the inventive amine adducts were much lower than those cured with pure (poly) amines, indicating that the cure heat can be suppressed by the use of the present coumarin-amine adducts as hardeners.

TABLE 4

| Example | onset temperature (° C.) | peak temperature (° C.) | $\Delta H$ (J/g) |
|---|---|---|---|
| 6 | 108.1 | 138.1 | −215 |
| 11 (reference) | 73.2 | 106.1 | −369 |
| 7 | 106.2 | 145.1 | −241 |
| 12 (reference) | 72.6 | 102.5 | −409 |
| 8 | 115.5 | 151.3 | −220 |
| 13 (reference) | 65.0 | 102.7 | −326 |
| 9 | 101.8 | 126.9 | −250 |
| 14 (reference) | 68.3 | 103.7 | −391 |
| 10 | 129.3 | 136.1 | −170 |
| 15 (reference) | 59.7 | 123.7 | −173 |

Analysis of the Curable Compositions by DSC in a Isothermally Heating Mode

The compositions were isothermally heated at 50° C. or 100° C. Only little amounts of cure heats were observed, indicating that the reactions were successfully suppressed under these heating conditions. On the other hand, when the temperature was elevated to 150° C., heat evolution due to progress of the curing reaction became apparent and were brought to the end within 10 min., indicating that the compositions cured fast under this curing condition. In summary, the DSC analyses of the inventive compositions revealed that the application of the amine adducts as hardeners allows much higher stability of the compositions below 50° C. than that of the compositions containing the unmodified amines as hardeners.

Adhesive Properties

Compositions of example 8 and 10 were tested as adhesives for metal bonding. The adhesion tests were performed according to ASTM D1002 method ("Apparent Shear Strength of Single-Lap-Joint Adhesively Bonded Metal Specimens by Tension Loading (Metal-to-Metal)") using a tension testing machine (model: RTC-1350A, manufactured by Orientec Corp., Japan) and as the test specimens (dimension=25.4 by 101.6 by 1.6 mm, grid blasted), mild steel (JISC3141, SPCC-SD), copper (JISH3100, C1 100P) and aluminum (JISH4000, A5052P) substrates were utilized. The tests were performed at room temperature under an atmosphere of 50% relative humidity.

Composition of example 8 and 10 were applied on metal specimens and were cured at 150° C. for 1 h. For three different substrates, the composition containing the coumarin-diamine adduct showed higher adhesion strengths than that the composition 13 containing the corresponding unmodified amine. Likewise composition 10 was employed as adhesive for metal bonding. It was applied on metal specimens and was cured at 150° C. for 1 h. The composition containing the coumarin monoamine adduct showed higher adhesion strengths than that of the composition containing the corresponding unmodified amine (Table 5).

TABLE 5

Lap-shear adhesion strength (MPa)

| Substrate | Compositions of | Test 1 | Test 2 | Test 3 | Test 4 | Test 5 | Test 6 | Average |
|---|---|---|---|---|---|---|---|---|
| Steel | Example 8 | 23.3 | 26.0 | 23.3 | 24.3 | 26.0 | 26.7 | 24.9 |
| | Example 13 (reference) | 22.2 | 16.7 | 17.8 | 21.6 | 21.8 | 17.7 | 19.7 |
| | Example 10 | 24.0 | 24.0 | 24.0 | 23.0 | 24.0 | 23.0 | 23.7 |
| | Example 15 | 15.6 | 16.6 | 13.9 | 14.6 | 14.4 | — | 15.0 |
| Aluminuim | Example 8 | 16.9 | 17.0 | 17.6 | 19.1 | 18.1 | 17.5 | 17.7 |
| | Example 13 (reference) | 12.8 | 11.6 | 11.6 | 8.8 | 9.8 | — | 10.2 |
| Copper | Example 8 | 18.0 | 17.4 | 17.4 | 20.6 | 18.0 | 20.6 | 19.2 |
| | Example 13 (reference) | 10.2 | 8.4 | 8.4 | 12.0 | 8.0 | — | 10.0 |

What is claimed is:

1. A curable composition comprising:
   a latent curing agent obtained by the reaction of a coumarin compound of the general formula (1)

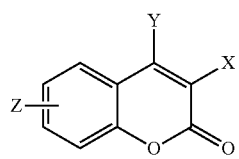

(1)

wherein X and Y can be independently H, an alkyl group, a heteroalkyl group, an aromatic group, a heteroaromatic group or an acetyl group, and Z can be H, OH, an alkyl group, a heteroalkyl group, an aromatic group, or a heteroaromatic group, with an amine of the general formula (2)

(2)

wherein "a" is 1 or 2,
   A can be an alkylene group, a heteroalkylene group, an aromatic group, or a heteroaromatic group, and
   B can be an alkyl group (if a=1), an alkylene group (if a=2), a heteroalkyl group (if a=1), a heteroalkylene group (if a=2), an aromatic group, a heteroaromatic group, a hydroxyl group (if a=1), a secondary amino group (if a=2), 0 or S (if a=2), B has a valence "a",
or B alone or A and B together form a ring system selected from an aliphatic ring system; and
   at least one epoxy resin.

2. A curable composition according to claim 1 wherein the amine is a primary monoamine which is reacted at a stoichiometric ratio of 2 equivalents of amine to 1 equivalent of the coumarin.

3. A curable composition according to claim 1 wherein the amine is a primary diamine which is reacted at a stoichiometric ratio of 1 equivalents of amine to 1 equivalent of the coumarin.

4. A curable composition according to claim 3 wherein the diamine is selected from the group consisting of tetramethylenediamine, hexamethylenediamine, 2-methylpentamethylenediamine, nonamethylenediamine, undecamethylenediamine, dodecamethylenediamine, 2,2,4-trimethylhexamethylenediamine, 2,4,4-trimethylhexamethylenediamine, 5-methylnonamethylenediamine, 1,3-bis(aminomethyl)cyclohexane, 1,4-bis(aminomethyl)-cyclohexane, 1-amino-3-aminomethyl-3,5,5-trimethyl-cyclohexane, bis(4-aminocyclo-hexyl)methane, bis(3-methyl-4-aminocyclohexyl)methane, 2,2-bis(4-aminocyclohexyl)propane, polyoxytetramethylenediamine, triethyleneglycoldiamine, polyoxyethylene-diamines, polyoxyethylenetriamines, polyoxypropylenediamines, m-xylylenediamine, p-xylylenediamine (XDA), 1,4-bis(aminopropyl)piperidine, 1-propanamine, 3,3'-(oxy bis(2,1-ethanediyloxy))bis-1-propanamine, diaminopropylated diethylene glycol, 1,3-diaminocyclohexane, 1,4-diaminocyclohexane, di(aminomethyl)cyclohexane, 1-amino-3-aminomethyl-3,5,5-trimethylcyclohexane, 4,4'-diamino-3,3'-dimethyldicyclohexylmethane, cyclohexylenediamine, 4,4'-diamino-dicyclohexylmethane, 4,4'-isopropylidenedicyclohexyldiamine, and 3,3'-dimethyl-4,4'-isopropylidenedicyclohexyldiamine or mixtures thereof.

5. A curable composition according to claim 2 where the monoamine is selected from the group consisting of butylamine, pentylamine, hexylamine, heptylamine, octylamine, nonylamine, decylamine, dodecylamine, cyclohexylamine, aminomethylcyclohexane, N-aminoethyl-piperidine, 1-amino-3,5,5-trimethyl-cyclohexane, benzylamine, aminophenol, 2-aminoethanol, 3-amino-1-propanol, 4-amino-1-butanol, 5-amino-1-pentanol or mixtures thereof.

6. A curable composition according to claim 1 wherein the coumarin is 1-benzopyran-2-on.

7. A curable composition according to claim 1 further comprising at least one of
   a flexibilizing agent,
   a reactive diluent,
   at least one finely divided filler,
   an accelerator, and
   a blowing agent.

8. A method of making a curing agent comprising the steps of
   (a) mixing with an amine of the general formula (2)

(2)

wherein "a" is 1 or 2,
   A can be an alkylene group, a heteroalkylene group, an aromatic group, or a heteroaromatic group, and
   B can be an alkyl group (if a=1), an alkylene group (if a=2), a heteroalkyl group (if a=1), a heteroalkylene group (if a=2), an aromatic group, a heteroaromatic group, a hydroxyl group (if a=1), a secondary amino group (if a=2), 0 or S (if a=2), B has a valence "a",
or B alone or A and B together form a ring system selected from an aliphatic ring system, a heteroaliphatic ring system, or an aromatic ring system with a coumarin compound, optionally in the presence of an polar solvent,
(b) heating the reaction mixture to a temperature between room temperature and 70° C. until the amine has completely reacted with the coumarin,
(c) precipitating the reaction mixture into a nonsolvent for the coumarin amine reaction product,
(d) filtering the precipitate from the liquid phase and
(e) drying the coumarin amine reaction product.

9. A method according to claim 8 wherein the solvent is selected from methanol, ethanol, acetone, dimethylsulphoxide (DMSO), N,N-dimethylacetamide (DMA) and tetrahydro-furane (THF) or mixtures thereof.

10. A method according to claim 8 comprising the addition of a basic catalyst.

11. A method according to claim 10 wherein the basic catalyst is a heterocyclic compound having an amidine bonding.

* * * * *